United States Patent [19]

Foa

[11] Patent Number: 4,960,220
[45] Date of Patent: Oct. 2, 1990

[54] CONTAINER ASSEMBLIES CAPABLE OF RECEIVING AND MAINTAINING PLURAL TYPES OF WASTE MATERIALS SEPARATED FOR SEPARATE DISPOSAL OF EACH TYPE OF WASTE MATERIAL

[76] Inventor: Uriel G. Foa, 631 Righters Mill Rd., Penn Valley, Pa. 19072

[21] Appl. No.: 364,097

[22] Filed: Jun. 9, 1989

[51] Int. Cl.⁵ .................................................. B65D 1/24
[52] U.S. Cl. .................................... 220/23.83; 220/909
[58] Field of Search .................. 220/1 T, 23.83, 23.86

[56] References Cited

U.S. PATENT DOCUMENTS

| | | | |
|---|---|---|---|
| 617,445 | 1/1899 | Nathan . | |
| 1,219,176 | 3/1917 | Sharp . | |
| 2,133,474 | 10/1938 | Roscoe | 221/69 |
| 3,720,346 | 3/1973 | Cypher | 220/1 T X |
| 4,739,894 | 4/1988 | Pender | 220/1 T |
| 4,834,253 | 5/1989 | Crine | 220/23.83 X |
| 4,834,262 | 5/1989 | Reed | 220/1 T X |

FOREIGN PATENT DOCUMENTS 3608031 10/1986 Fed. Rep. of Germany .

*Primary Examiner*—Steven M. Pollard
*Attorney, Agent, or Firm*—Dann, Dorfman, Herrell and Skillman

[57] ABSTRACT

A container assembly capable of receiving and maintaining plural types of waste materials such as paper, cans, glass and plastic in a separated form for separate disposal of each type of waste material for recycling purposes. The container assembly has a first container comprising a given number of separate compartments and a satellite container and/or chute, each of which also has the same number of compartments as the first container. The satellite container and/or chute is capable of being positioned over the first container so that the specific type of waste material in a given compartment of the satellite container or chute is deposited in the compartment of the first container holding the same specific type of waste material. The material maintained in the first container is able to be transferred to a conveyance for transporting such materials.

25 Claims, 3 Drawing Sheets

FIG. 6
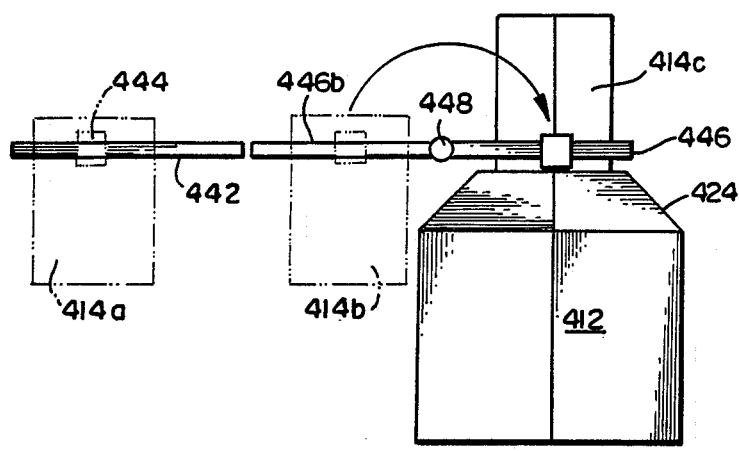
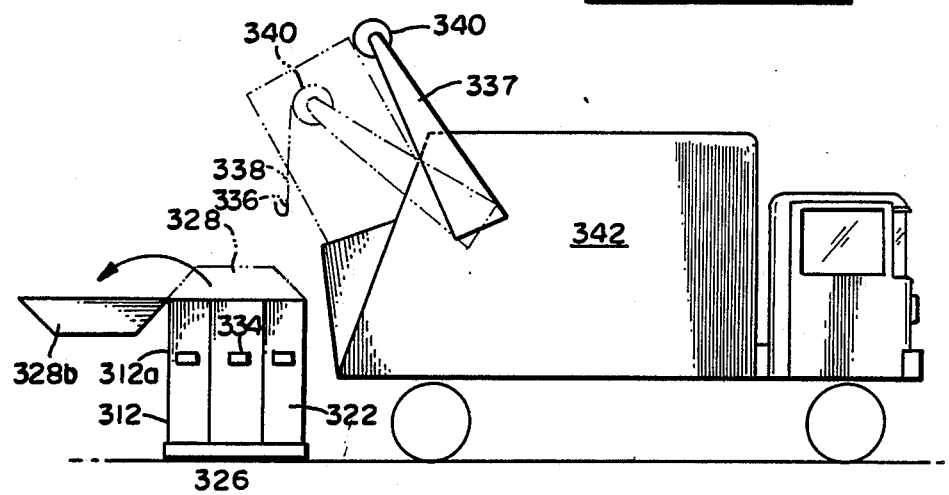
FIG. 5

CONTAINER ASSEMBLIES CAPABLE OF RECEIVING AND MAINTAINING PLURAL TYPES OF WASTE MATERIALS SEPARATED FOR SEPARATE DISPOSAL OF EACH TYPE OF WASTE MATERIAL

FIELD OF THE INVENTION

This invention relates to container assemblies capable of receiving and maintaining in a separated form plural types of waste materials for separate disposal of each type of waste material.

BACKGROUND OF THE INVENTION

For many years, the disposal of waste materials such as trash and garbage has been a major problem in many communities. To reduce this problem, many communities have required separation of certain waste materials such as newspapers, glass and plastic bottles and aluminum cans for recycling purposes. As a result, people and businesses in such communities need to separate such waste materials and maintain said materials in a separated form until the community can collect them.

For example, U.S. Pat. Nos. 617,445, 1,219,176, 3,720,346 and 4,739,894 describe receptacles of waste materials having compartments or separate containers available to separate waste materials. The '346 patent also has a removable cover with an adjustable opening which permits such compartments to be emptied in succession into separate trash receivers whose contents are collected periodically.

U.S. Pat. No. 2,133,474 describes an apparatus for the handling and dispensing of a material such as a corrosive or caustic liquid in which the container is attached to the receiver by a hinge and is pivoted over the receiver resulting in liquid flowing from the container to the receiver.

SUMMARY OF THE INVENTION

It is an object of this invention to transfer plural types of Waste material to a first container comprising a given number of separate compartments from one or more satellite containers having the same given number of separate compartments to maintain the plural types of waste material separated in the first container to permit their individual collection.

It is another object of this invention to enable transfer of such individual types of waste material from the compartments of said first container to conveyances, such as trucks, for transporting away such waste material.

The invention provides for a container assembly capable of receiving and maintaining plural types of waste materials in separated form for separate disposal of each type of waste material. The assembly comprises in part a first container with a given number of separate compartments comprising separate units disposed in an array. The first container has an open top with a cover adapted to close said top.

The assembly also has a satellite container smaller than the first container. The satellite container has a plurality of separate compartments in an array within that satellite container corresponding in number to said given number and means to permit displacement of the compartments. The satellite container has an open top with a cover adapted to close said top.

The assembly also has means to guide and position the satellite container upside down over the first container so that each of the compartments of the satellite container can overlap a corresponding compartment of the first container. Upon displacement of a cover over the satellite container, the type of waste material in a given compartment of the satellite container is deposited into the corresponding compartment of the first container holding that same specific type of waste material.

In place of or in addition to the satellite container, there can be a chute with a plurality of separate partitions corresponding in number to said given number and funnel means on the bottom of the chute to effect registry of each of said partitions with an inner side of a related compartment of the first container.

Alternatively, the compartments in the satellite container may be of the same number as and overlap the partitions in the chute thus allowing the waste material in a given compartment of the satellite container to be deposited into a corresponding partition of the chute.

The first and satellite containers and compartments within said containers may be constructed in any suitable geometric shape (i.e., circular, hexagonal, square, rectangular, trapezoidal or pie-shaped) that allows registry between the first container and the satellite container or chute. In another embodiment of the invention, the array of compartments in said first container has a recess affording access to the center of the first container.

BRIEF DESCRIPTION OF THE DRAWINGS

These and other objects of the invention will be set forth in more detail in the following description when read in conjunction with the drawings, in which:

FIG. 5 is a diagrammatic view in side elevation of waste material from a compartment of the first container being unloaded into a conveyance for transporting waste materials.

FIG. 6 is a diagrammatic view in side elevation showing a container assembly in which the satellite container is guided and positioned over the first container by a combination of rails and an axle.

DESCRIPTION OF A PREFERRED EMBODIMENT

Figure 1:
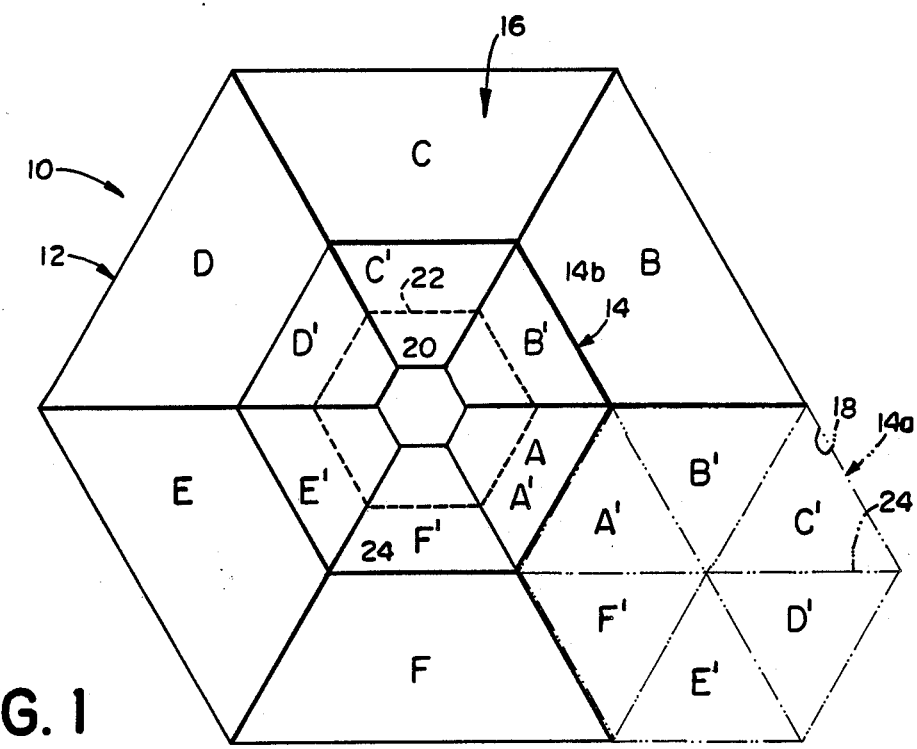
FIG. 1 is a plan view of a container assembly arranged in accordance with the invention.

FIG. 1 illustrates a container assembly 10. The container assembly has a first container 12 and a satellite container 14.

The first container contains six compartments 16 designated as A, B, C, D, E and F. Each of these compartments is trapezoidal in shape. The compartments are arranged together in a circular array with each non-parallel side of each compartment next to a non-parallel side of another compartment. The shortest parallel side of each compartment is toward the center of the first container and may confront the shorter parallel sides of the other compartments. The other parallel side is on the circumference of said container.

in FIG. 1, compartment A is smaller than the equally proportioned compartments B through F. The resulting first container has a circular array of compartments A through F that occupies less than 360° of the circumference of the hexagon that will be formed if the compartment A were of the same size as compartments B through F. The array is in the shape of a hexagon except for a trapezoidal recess within the area of such a hexagon that is located next to compartments A, B and F.

This recess provides access close to the center of the first container. In FIG. 1, a satellite container 14, shown in phantom lines, is brought within the recess to a designated position at 14a. The satellite container shown herein, like the first container, has six compartments 18 designated as A', B', C', D', E' and F'. The satellite container's compartments are separate trapezoidal or pie shaped compartments extending radially from the center to the outer wall of said container. The satellite container compartments form a circular array in which each side of each compartment (other than the wall side) is adjacent or coincident with a side (other than a wall side) of an adjacent compartment. The six compartments of the satellite container may be formed by partitions 24 inside the container.

Figure 2:
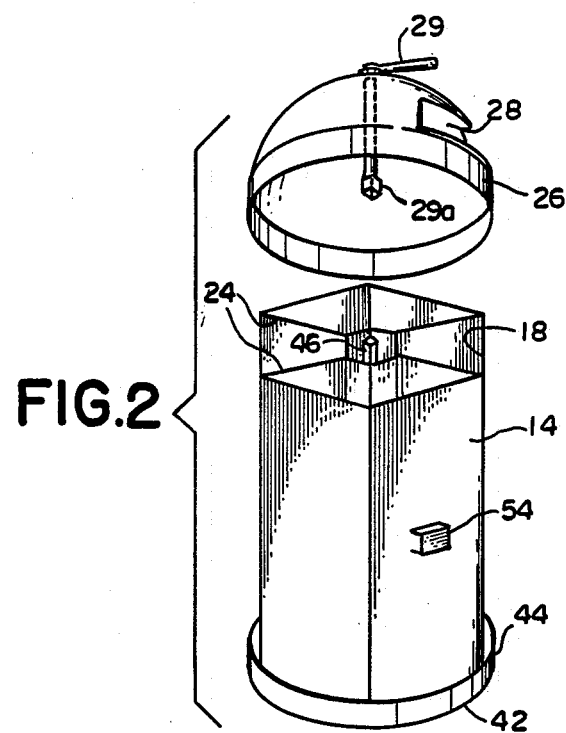
FIG. 2 is a perspective view of the satellite container showing the lid elevated.

As shown in FIG. 2, the satellite container 14 may be mounted in a base 42. The compartments of the satellite container illustrated in FIG. 2 share a common peripheral wall and floor that are respectively separate from and within the upstanding wall 44 of the base 42 for the satellite container. This common floor rests on and has wheels or coasters that engage in the base of the satellite container, thereby allowing the compartments to be rotated. A central axle 46 may be mounted in said common base 42 that is capable of being rotated. The axle 46 has a keyed connection to the bottom 29a of a handle 29 that is mounted on top of the satellite container. By rotation of the handle 29 and thereby of the axle 46, the compartments of the satellite container are rotated, allowing easier access to specified compartments. In addition, wheels, coasters or other means of assisting in guiding the satellite container to a desired location may be attached underneath the base of the satellite container. Receptacle 54 is provided for connection to a rod and handle to facilitate the transfer of the satellite container.

In a preferred form, as shown in FIG. 2, the satellite container's cover 26 includes a single opening 28 adapted to be aligned with any selected one of the compartments 18 of the satellite container. The cover 26 is mounted for rotation in relation to said compartments 18 to sequentially register the single 28 opening with each of said compartments in said array.

The satellite container is guided and positioned from the designated position 14a to a designated position 14b shown in FIG. 1 in which the satellite container, shown in full lines, is upside down on top of the first container. Each of the satellite container's compartments is in registry with a selected compartment of the first container (i.e., compartment A' with A). In a preferred embodiment, each of the compartments of the first container has a funnel 20 connecting the inverted open tops of each satellite compartment 18 with the open top of each container compartment 16.

As shown in FIG. 1, the first container is substantially larger than the satellite container. A container assembly that is not used heavily (e.g., for a family) may have a first container that is less than six times larger than the satellite container. The total capacity of such a first container is preferably equivalent to about 40 gallons of waste material. A container assembly for a large complex may have a first container greater than ten times or even greater than one hundred times the storage capacity of the satellite container.

Figure 3:
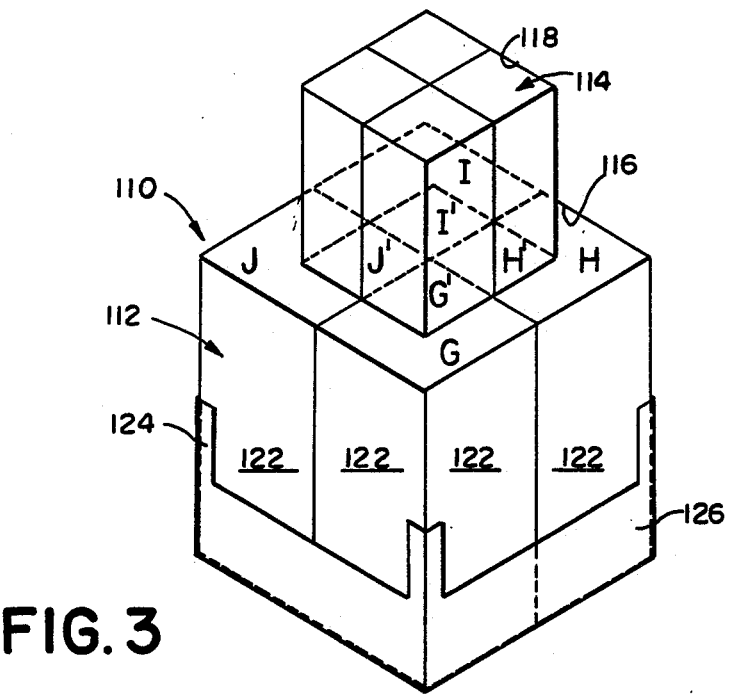
FIG. 3 is a perspective view of another container assembly in accordance with the invention.

FIG. 3 illustrates an alternate form of container assembly 110 with a first container 112 and a satellite container 114. The first container has a square cross-section and comprises four compartments designated as G, H, I, and J, with each compartment having a square cross section. The satellite container 114 also has four compartments designated as G', H', L', and J', with each compartment having a square cross-section. In FIG. 3, the satellite container 114 is positioned upside down over the first container 112 so that each compartment 118 of the satellite container is in registry with a selected associated compartment 116 of the first container (i.e. G' to G).

In a preferred form, the registry between the compartments of the first and satellite containers is supported by a keyed connection between the satellite and first container.

The first and satellite containers 112 and 114 and compartments 116 and 118 of such containers having square horizontal cross-sections, may be substituted with first and satellite containers and compartments having rectangular shapes in that such rectangular shaped containers and compartments are capable of having each compartment of the satellite container in registry with a selected associated compartment of the first container. The containers and compartments may be made of many shapes (i.e., circular, hexagonal, square, rectangular, trapezoidal or pie-shaped) as illustrated by the FIG. 1 illustration of a hexagon shaped container with pie shaped compartments and a first container with trapezoidal shaped compartments and the FIG. 3 illustration of square compartments, as long as the shape of the compartments and containers permit each of such compartments of the satellite container to be in registry with a selected associated compartment of the first container.

The satellite container 114 illustrated in FIG. 3 may comprise the end part of a chute having four partitions from the compartments G', H', 1' and J', which correspond in number to the four compartments of the first container. At the bottom of said chute, there are funnels (not shown) to effect registry of each of said partitions with an inner side of a selected associated compartment of the first container.

In a preferred form, the first container 112 has compartments 116 which comprise separate units 122 contained on the outer side by at least one column 124 and a peripheral wall 126 with said peripheral wall preferably being lower than the upper sides of the compartment units 122 contained therein.

Figure 4:
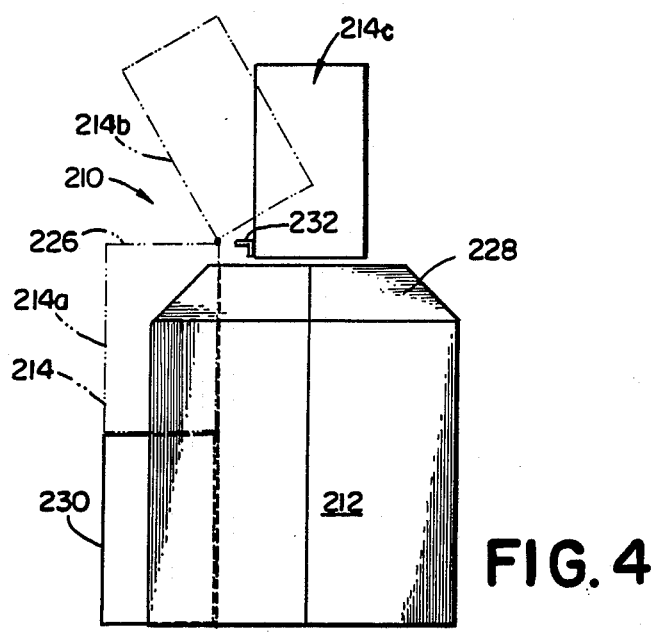
FIG. 4 is a diagrammatic view in side elevation of the container assembly illustrating in broken lines the satellite container as it is guided and positioned over the first container.

FIG. 4 illustrates a container assembly 210 with a satellite container 214 having a displaceable cover 226 being guided and positioned upside down over a first container 212 also having a displaceable cover 228 With central openings which conform to and may register with the open tops of the compartments in the satellite container 214.

In a designated position shown in broken lines at 214a in FIG. 4, a satellite container 214 is resting on a support 230 within a recess in the first container 212. The satellite container is lifted and rotated on a fitting 232 mounted above the cover 228 of the first, passing through a designated intermediate position 214b in which the covered satellite container, again shown in phantom lines, is substantially upside down. In a designated position at 214c, the satellite container 214 shown in full lines is positioned upside down over the first container 212, with each compartment of the satellite container in registry with a specified compartment of the first container.

By displacement of the cover of the satellite container, the waste material in each given compartment of the satellite container is deposited into the corresponding compartment of the first container holding that same specific type of waste material.

FIG. 5 illustrates the removal of individual compartments 322 of a first container 312 to a conveyance 342. The separate compartments are nested together within base 326 and have a handle 334.

In a designated position at 312a, the first container 312 is normally closed by a cover 328, in a position shown in phantom lines. The cover 328 is displaced, to the side of the first container 3)2 where the cover is shown in full lines in a designated position at 328b.

After the cover has been displaced, a handle 334 on a compartment 322 in the first container 312 is grabbed by a hook 336, said hook being supported on a crane arm 337 by a cable 338 and pulley 340 mounted on the conveyance 342. The crane 337 from the rope and pulley is shown in phantom lines, for attachment of the hook to the handle 334. After the hook has engaged the handle, the crane arm 337 is raised to the full line position and the separate compartment 322 is lifted away from the first container and tipped into the back of the conveyance used to transport said waste material away from the container assembly.

Alternately, waste material may be removed from each compartment of the first container to the conveyance by a vacuum means contained on the conveyance. To accomplish this result, the first container is positioned adjacent to the conveyance, and coupling means in the form of a hollow flexible tubular member is inserted into a selected one of the compartments of the first container holding waste material. The conveyance vacuum means withdraws the waste material in the selected one of the compartments from the compartment through the member and into said conveyance. As part of such a vacuum transfer, the conveyance may conveniently have an array of receivers each adapted to receive waste material from a different compartment of said first container.

In a preferred alternative in which all of the compartments are emptied at the same time into selected receivers of an array of receivers on the conveyance, the first container comprises the array of receivers and the satellite container comprises the last referenced compartments.

The conveyance shown in FIG. 5 in the form of a vehicle may be replaced by other forms such as a conveyor belt having different compartments or receiving areas for the different types of waste material.

FIG. 6 illustrates another suitable means of guiding and positioning of a satellite container upside down over a first container. In this case a satellite container 414 has shoes 444 which permit the container to travel on a track 442 leading from the satellite container's place of use to the first container.

As shown, a satellite container, shown in phantom lines at 414a, travels the tracks 442 which comprises two parallel rails by means of the shoes 444 which are attached at opposite sides of the satellite container 414.

At the end of the tracks 442, a pair of swinging rails 446 are aligned with the rails of the track as shown in phantom lines 446b. The satellite container is guided from the rails 442 onto the swinging rails 446 so that the satellite container, shown in phantom lines at 414b, is carried by the two swinging rails 446. The swinging rails 446 are then rotated 180° by means of an axle 448 whereby the satellite container, shown in full lines, is in a designated position at 414c upside down over the first container 412. The first container has a removable cover 424 that may be associated with the axle 448 to cooperate with the satellite container to prevent waste material from falling out of that container prematurely.

While a particular embodiment of the present invention has been herein illustrated and described, it is not intended to limit the invention to such disclosure, but changes and modifications may be made therein and thereto within the scope of the following claims.

I claim:

1. A container assembly capable of receiving and maintaining plural types of Waste materials in a separated form for separate disposal of each type of waste material, said assembly comprising:
   (a) a first container comprising a given number of separate compartments;
      (i) said given number of separate compartments disposed in an array;
      (ii) each of said compartments extending from a center of the container to the outer side and having an open top;
   (b) a satellite container smaller than the first container, said satellite container having:
      (i) an open top;
      (ii) a plurality of separate compartments in an array within that satellite container corresponding in number to said given number;
      (iii) a displaceable satellite cover means mounted on the top of the satellite container and adapted to close said open top; and
   (c) means to guide and position the satellite container upside down over the first container so that each of the compartments of the satellite container can overlie a corresponding compartment of the first container so that upon displacement of the satellite cover means, the specific type of waste material in a given compartment of the satellite container is deposited into the corresponding compartment of the first container holding that same specific type of Waste material.

2. A container assembly as set forth in claim 1 wherein said array of compartments in said first container occupies less than entire periphery thereof to provide a recess affording access to the center of the first container, and said array of said compartments in said satellite container occupying the full periphery thereof, said guide means including funnel means to couple each of said compartments of said first container with the corresponding compartment of the satellite container.

3. A container assembly as set forth in claim 1 wherein the storage capacity of said first container is less than six times larger than the storage capacity of said satellite container.

4. A container assembly as set forth in claim 1 wherein the array is circular and the compartments of the first container ar pie shaped.

5. A container assembly as set forth in claim 1 wherein the compartments of the first container are square in shape.

6. A container assembly as set forth in claim 1 wherein the compartments of the first container are rectangular in shape.

7. A container assembly as set forth in claim 1 wherein the compartments of the first container are trapezoidal in shape.

8. A container assembly as set forth in claim 1 wherein each of the separate compartments in the first container consists of a separate unit having means by which the unit can be displaced in order to facilitate transfer of the waste material held in said compartment to a conveyance for transporting said waste materials away from the container assembly.

9. A container assembly as set forth in claim 1 wherein the means to guide and position the satellite container upside down over the first container comprises:
   (a) means to guide said satellite container into a first position adjacent the first container; and
   (b) axle means capable of rotating at least 180 degrees and having two rails adapted in one position to be adjacent to said first position, the satellite container having means to engage the axle rails, and means to rotate said axle means so that the satellite container and rails are rotated to a second position in which the satellite container is upside down over the first container.

10. A container assembly according to claim 9 wherein said guide means comprises a pair of fixed rails at said first position adapted to align with said axle rails.

11. A container assembly as set forth in claim 1 including a conveyance having at least one receiver, and means to couple each compartment of the first container to said conveyance receiver whereby the waste material in the selected one of the compartments is transferred from the first container compartment into said conveyance receiver.

12. A container assembly as set forth in claim 11 wherein said conveyance is operable to transport said waste materials away from the container assembly, said conveyance having an array of receivers, each adapted to receive waste material from a different compartment of said first container.

13. A container assembly as set forth in claim 11 wherein said conveyance comprises a vehicle.

14. A container assembly as set forth in claim 1 wherein said satellite cover includes a single opening adapted to be aligned with any selected one of the compartments of the satellite container by displacement of said cover.

15. A container assembly as set forth in claim 14 wherein the satellite cover is mounted on top of the satellite container for displacement by rotation of said cover in relation to said satellite container compartments to sequentially register the single opening with each of said compartments in said array.

16. A container assembly as set forth in claim 1 including a base for said satellite container having an upstanding peripheral wall, the compartments of the satellite container sharing a common peripheral wall and floor separate from and within the upstanding wall of the base.

17. A container assembly as set forth in claim 16 wherein said common floor rests on movable means that engages in the base of the satellite container and allows the compartments to be rotated.

18. A container assembly as set forth in claim 17 wherein said satellite container also comprises an axle mounted in said common base, said axle being capable of being rotated in order that by rotation of the axle, the compartments of the satellite container are rotated.

19. A container assembly as set forth in claim 1 wherein the means to guide and position the satellite container comprises a fitting mounted above the cover of the first container for attachment to the satellite container to guide and position said satellite container into said upside down position.

20. A container assembly capable of receiving and maintaining plural types of waste materials in a separated form for separate disposal of each type of waste material, said assembly comprising:
   (a) a first container having a peripheral wall with an open top;
   (b) a given number of separate compartments disposed in a circular array within said first container, said compartments extending radially from the center to the wall of said container;
   (c) a cover mounted on said first container, the cover adapted to close said open top and having an opening adapted to be aligned with any selected one of the compartments;
   (d) a satellite container smaller than the first container, said satellite container having an outer wall and an open top;
   (e) a plurality of separate pie-shaped compartments in a circular array within said outer wall corresponding in number to said given number, said satellite container's compartments extending radially from the center to said outer wall of said container;
   (f) a cover mounted on the top of the satellite container, said satellite container cover adapted to close said open top and having an opening adapted to be aligned with a selected one of the compartments of the satellite container;
   (g) means for mounting said cover for rotation relative to said compartments to sequentially register said opening with each of said compartments in said circular array; and
   (h) means operable to guide and position the satellite container upside down over the first container so that each of the compartments of the satellite container can overlap a corresponding compartment of the first container so that by rotating the satellite container's cover, the specific type of waste material in a given compartment of the satellite container is deposited into the corresponding compartment of the first container holding that same specific type of waste material.

21. A container assembly as set forth in claim 20 wherein said first container's peripheral wall is lower than the upper sides of the given number of separate compartments contained therein.

22. A container assembly as set forth in claim 20 wherein said circular array of compartments in said first container occupies less than 360° of the circumference thereof to provide a recess affording access to the center of the first container, and said array of said compartments in said satellite container occupying the full 360° of the circumference thereof; said guide means including funnel means to couple each of said compartments of said first container with the corresponding compartment of the satellite container.

23. A container assembly as set forth in claim 20 wherein the satellite container includes means for guiding the container to a desired location.

24. A container assembly capable of receiving and maintaining plural types of waste materials in a separated form for separate disposal of each type of waste material, said assembly comprising:
- a first container having a peripheral wall with an open top;
- a given number of separate compartments disposed in a circular array within said large container, said compartments extending radially from the center to the wall of said container;
- a satellite container smaller than the first container, said satellite container having a peripheral wall with an open top;
- a plurality of separate pie-shaped compartments in a circular array within that satellite container corresponding in number to said given number, said satellite compartments extending radially from the center to the wall of said container;
- a displaceable cover mounted on the satellite container to close said open top; and
- means operable to guide and position the satellite container upside down over the first container so that each of the compartments of the satellite container can overlap a corresponding compartment of the first container so that by displacement of the satellite container's cover, the specific type of waste material in a given compartment of the satellite container is deposited into the corresponding compartment of the first container holding that same specific type of waste material.

25. A container assembly capable of receiving and maintaining plural types of waste materials in a separated form for separate disposal of each type of waste material, said assembly comprising:
- a first container comprising a given number of separate compartments, each of such compartments having an open top, said given number of separate compartments comprising separate units disposed in an array, said units having inner sides confronting other units of the container and being contained at the outer side by at least one column;
- a cover mounted on said first container, the cover adapted to close said open tops;
- a satellite container having an open top adapted to receive waste materials and a plurality of partitions within said container, said partitions corresponding in number to said given number; and
- funnel means to effect registry of each of said partitions with an inner side of a compartment of the first container to provide a given number of passageways, each coupled to one unit of said first container.

* * * * *